Patented Feb. 9, 1926.

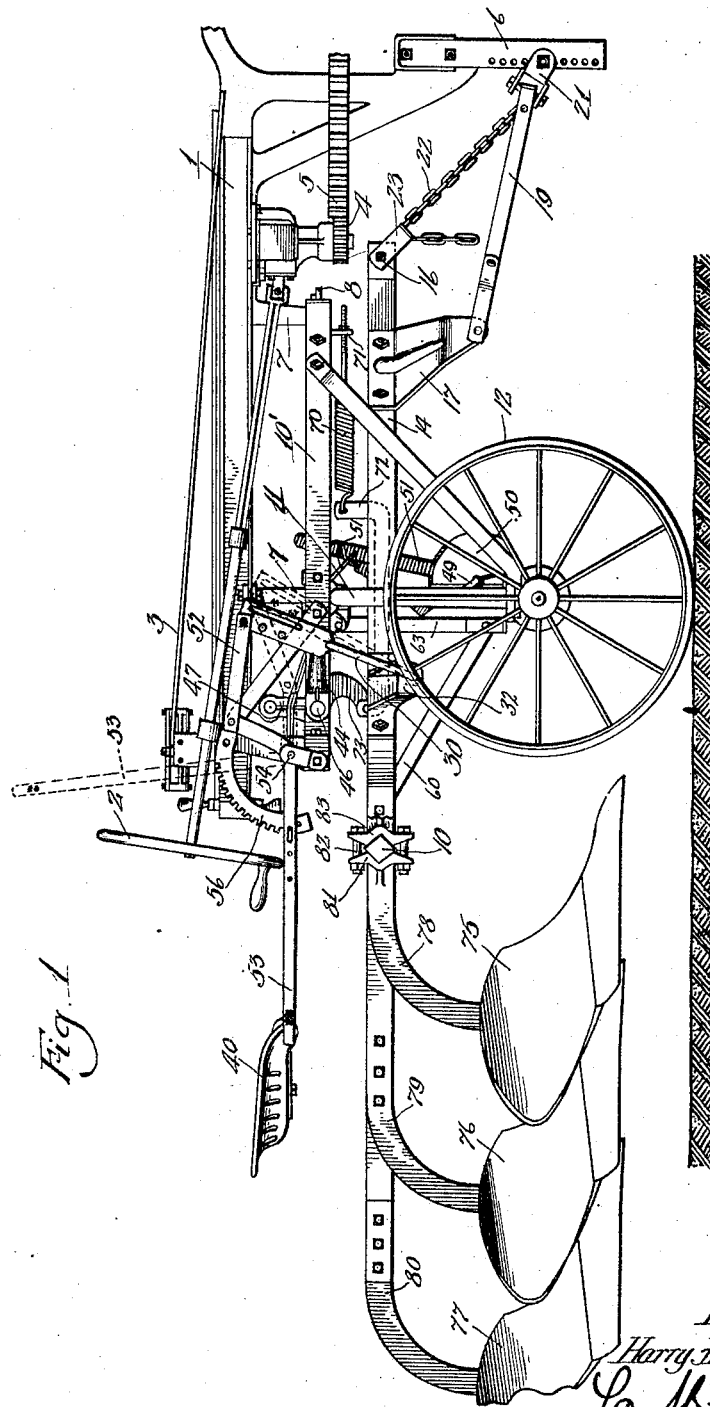

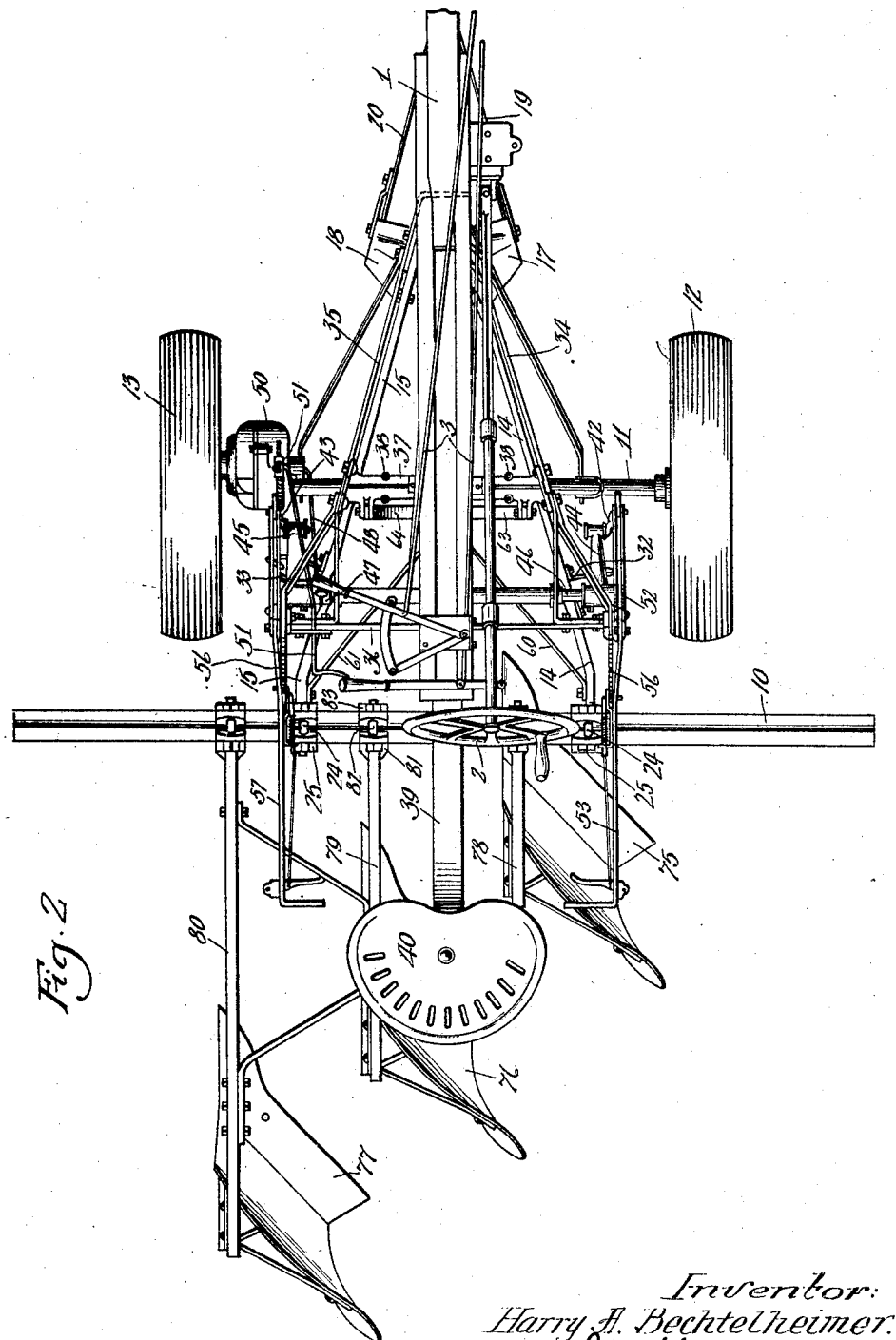

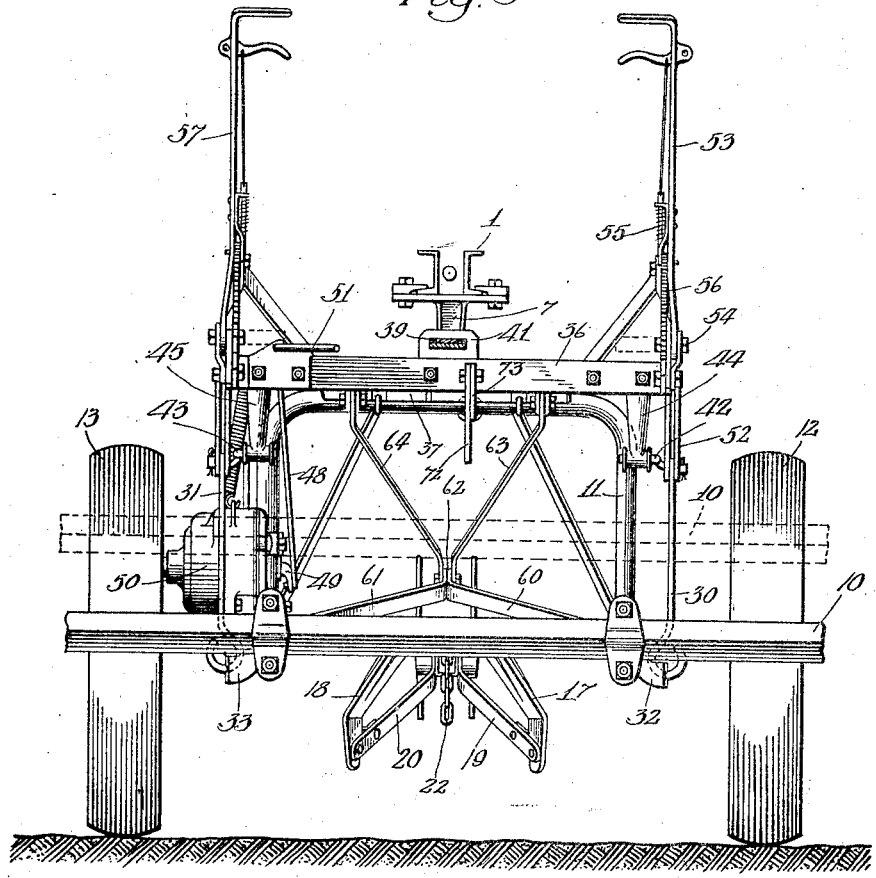
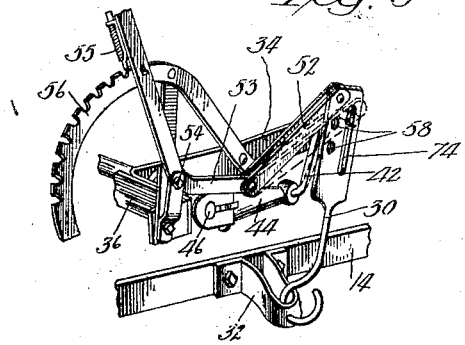

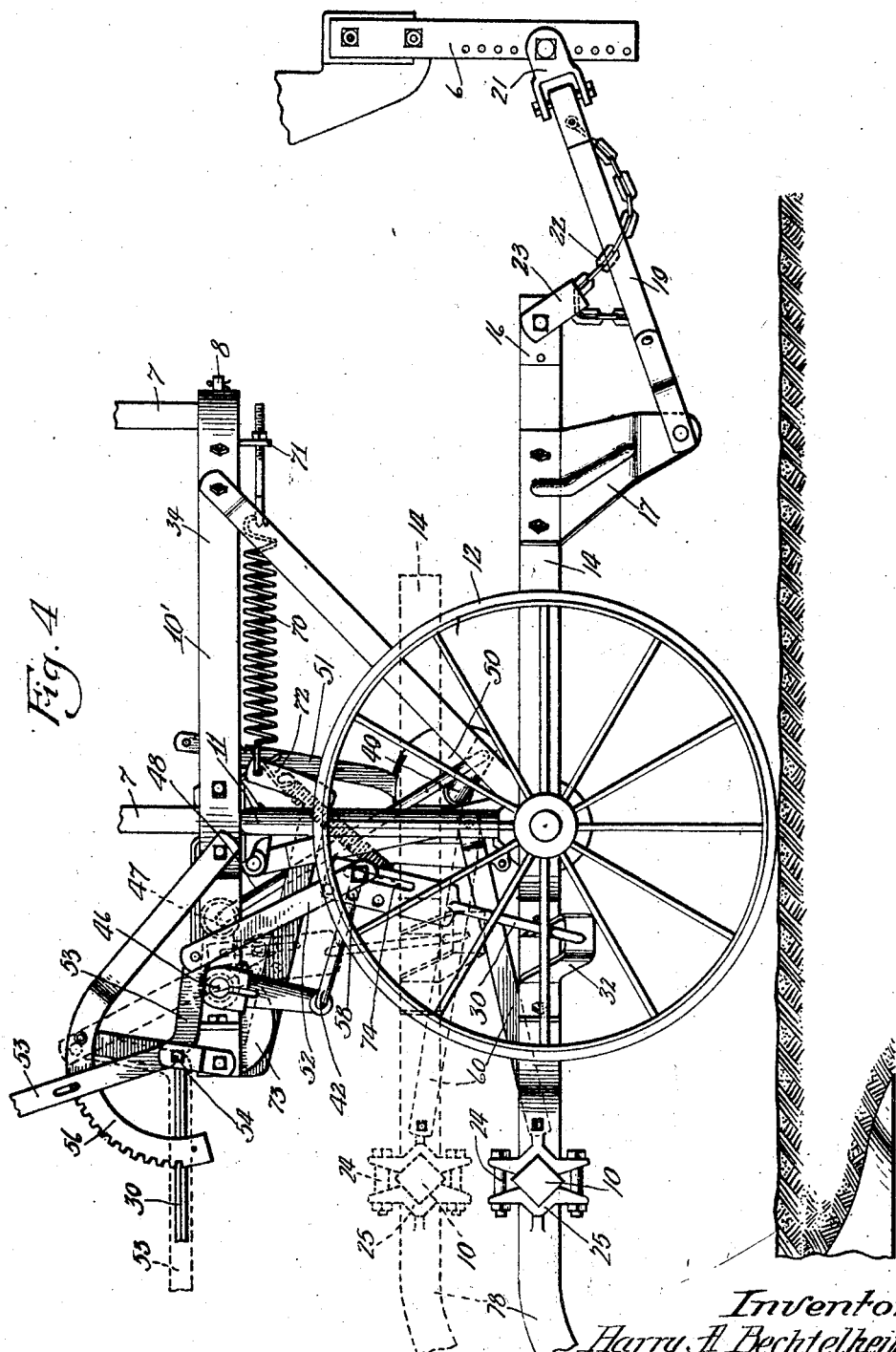

1,572,462

UNITED STATES PATENT OFFICE.

HARRY A. BECHTELHEIMER, OF ROCK ISLAND, ILLINOIS, ASSIGNOR, BY MESNE ASSIGNMENTS, TO MOLINE IMPLEMENT COMPANY, A CORPORATION OF ILLINOIS.

POWER FARMING APPARATUS.

Application filed February 24, 1923. Serial No. 621,043.

*To all whom it may concern:*

Be it known that I, HARRY A. BECHTELHEIMER, a citizen of the United States, residing at Rock Island, county of Rock Island, State of Illinois, have invented certain new and useful Improvements in Power Farming Apparatus, of which the following is a specification.

The invention relates to power farming apparatus.

It relates particularly to improvements in the type of apparatus disclosed in the copending application of Harry A Bechtelheimer and Henry P. Corbin, Serial No. 535,187, filed February 9, 1922.

In the application referred to, a power farming apparatus is shown having a tool bar to which a wide variety of agricultural tools may be connected. A draft frame connects the tool bar with the draw bar of a tractor and the draft frame is supported at two pivot points which are adjustable to vary the position of the frame, and through which the frame is raised. It is sometimes desirable to have the frame "float", that is, to be free of rigid pivots so that it can adjust itself to the requirements of special services. The present invention is directed toward an improvement by means of which the power apparatus may have all the features already possessed with the additional feature of being capable of being adjusted so that a more complete floating action of the tool bar may be secured.

The general object of the invention is to provide an improved power farming apparatus.

More specifically, the object is to provide a power farm apparatus of the type described in which the tool bar and its supporting means may be free to float independently of the supporting connections.

Other objects and advantages of the invention will appear from the specification and drawings.

An embodiment of the invention is shown in the drawings in which,

Figure 1 is a side elevation showing the tool bar in raised position.

Figure 2 is a plan view.

Figure 3 is a rear elevation.

Figure 4 is an enlarged side elevation with certain of the parts omitted.

Figure 5 is a perspective view of a portion of the adjusting and lifting mechanism.

The implement is illustrated as connected to a front wheel drive tractor of the type disclosed in Reissue Patent No. 14,985, November 16, 1920. It may be connected to other types of tractors, however, if desired, and it is to be understood that it is not limited to use with the tractor illustrated.

A tractor of the type shown, has a rearwardly extending coupling frame 1 pivoted to the main body of the tractor to swing about a substantially vertical axis. The coupling frame usually supports a steering wheel 2 and control devices 3, the steering wheel serving to rotate a steering pinion 4, cooperating with a rack 5 on the tractor frame to thereby swing the coupling frame relative to the tractor for steering purposes. Two brackets 7 extend downwardly from the coupling frame to attach the frame to a device to be drawn. These brackets are preferably attached to the drawn devices by being pivoted thereto by pivot pins 8, one of which is shown in Figure 1. This permits a slight movement of the drawn devices relative to the coupling frame in a longitudinal direction, and also permits the drawn devices to swing about a substantially longitudinal axis to adjust itself to inequalities in the surface of the ground. The tractor also has a draw bar 6 which may be either attached to the main frame of the tractor or to the coupling frame as illustrated in Figure 1.

The universal implement comprises, in general, a tool bar 10 adapted to receive a wide variety of agricultural tools. Connected to this tool bar is a draft device supported by a frame 10 carried by a crank axle 11 having ground wheels 12 and 13.

The tool bar 10 is a plain rectangular metal bar, preferably square, positioned with two of its edges in a substantially vertical plane. Its length may be varied, but it is preferably about the length illustrated relative to the supporting wheels. The various types of tool attachments may be connected to this bar, the number, the spacing, and the different types that may be used in combination being of such great variety that it is not expedient to attempt to enumerate them in detail.

The draft device comprises two forwardly converging side members 14 and 15 connected to each other at their forward ends at the point 16. Fixed to the side bars 14 and 15 near their forward ends are two downwardly extending arms 17 and 18 to which are pivoted draft bars 19 and 20 that converge forwardly to a point where they are arranged to be attached to a clevis 21 which may be adjustably connected to the tractor draw bar. A flexible member, such as a chain 22 is connected at one end to the forward ends of the draft bars, and at its other end is adjustably hooked in a slot in a member 23 pivoted to the forward end of the bars 14 and 15. This connection gives a flexible hitch when the implement is in operating position, as illustrated in Figure 4, and a hitch which forms a rigid brace when the implement is raised, as illustrated in Figure 1. By means of this hitch, the front end of the draft frame may be raised or lowered by simply changing the connection of the chain 22 to the pivoted member 23. This is easily accomplished by hooking different links of the chain through the slot in member 23.

The draft bars 14 and 15 are connected to the tool bar 10 by having their ends forged to fit the tool bar, such ends being provided with ears for the reception of bolts 24 which cooperate with complementary clamping members 25 to rigidly clamp the draft bars to the tool bar. This connection is an easy one to adjust and at the same time, a rigid one.

The tool bar and draft frame are supported, adjusted, raised, and lowered through the medium of links 30 and 31 pivoted in U-shaped arms 32 and 33 bolted to the sides of the bars 14 and 15. These arms are connected with mechanism supported by the frame of the machine which will now be described.

The frame of the machine is preferably of triangular shape, as illustrated in Figure 2. It comprises two side members 34 and 35 connected at their rear by a bracing member 36 and near their center by a cross brace 37, the latter acting as a connection for the crank axle 11 which is bolted to it by bolts 38.

An operator's seat is provided comprising a seat bar 39 carrying a seat 40, the front end of the bar being bolted to a bracket on the under side of the cross brace 37. The bar extends through a slot in a support 41, bolted to the rear cross brace 36. The support 41 extends above the brace 36, as illustrated in Figure 3, but if it is desired to lower the operator's seat, the position of the support may be changed so that it extends downwardly from the brace 36.

The crank axle 11 is rigidly held in an upright position, and the supporting wheels 12 and 13 are journalled on its ends. The exact shape of the crank axle and supporting wheels may be varied, but the construction shown has been found desirable.

The raising and adjusting mechanisms operate through the link 32 and 33. These links are connected at the upper ends to links 42 and 43 pivoted to arms 44 and 45 fixed to a shaft 46 journalled on the frame. This shaft has another arm 47 connected by a link 48 to the crank 49 of the powerlift mechanism 50, the latter being operated by power from the ground wheel 13. Only one powerlift mechanism is shown, but one may be used for each ground wheel if desired. The powerlift mechanism is thrown into operation by the movement of a lever 51. Its operation is as follows:

When the machine is in lowered position, as illustrated in Figure 4, the crank 49 is in the position there illustrated. If the powerlift mechanism is set into operation, it moves the crank through one cycle from the position illustrated to a position at approximately 180 degrees from that shown. This movement rotates the shaft 46 in a counter-clockwise direction, moving the arms 44 and 45 from the position illustrated in Figure 4 to that illustrated in Figure 1. This movement raises the tool bar from the position shown in full lines in Figure 4 to the position shown in Figure 1.

The adjusting mechanism is duplicated on each side of the machine, and, for the sake of simplicity, only one side will be described. It includes a link 52 pivoted to the joint between the links 30 and 42, and connected to the forward end of a bent lever 53 pivoted at the point 54 to the frame, and having a latch 55 cooperating with a toothed segment 56 attached to the frame. A lever 57 on the opposite side of the machine is connected to a similar adjusting mechanism.

It will be noted that a series of holes 58 are provided in link 30 to permit different relative connections of the parts.

When the parts are in the full line position, illustrated in Figure 4, that is, when the tool bar is lowered, movements of the adjusting lever 53 act directly to raise or lower the tool bar, the raised position of the parts being illustrated in dotted lines in Figure 4.

If the adjusting lever is moved when the tool bar is in raised position, as illustrated in Figure 3, the adjustment has no substantial effect in raising or lowering the tool bar because the link 30 is swung through a short portion of the top of its arc, and no longitudinal movement is transmitted. The dotted line position in Figure 1 shows the range of movement.

An important advantage of this feature of the adjusting mechanism is that the tool bar is always raised to substantially the same height above the ground, thereby insuring that the tools will be sufficiently high to clear obstructions while being transported. The result is secured because of the construction and coordination of parts. The height of the tool bar above the ground is always the same when raised because, regardless of what the adjustment of the lever 53 may have been, the height position of the tool bar, when raised, is substantially the same for all adjustments of the lever.

Another important advantage is that the tool bar will always be raised to a level position, even though the two sides may have been adjusted to different height positions for operating purposes. The level lift is obtained for the same reason as the uniform height of lift, namely, that no matter what the adjusted positions of the levers may have been for operation, the height of the bar, when raised, is substantially the same for all such adjusted positions.

By adjusting the levers 53 and 57, either or both sides of the frame may be adjusted to adapt the machine so that one ground wheel may travel in a furrow or so that the machine may operate on side hills or irregular ground. The draft connection at the forward end is sufficiently loose to permit freedom of movement so that the tool bar may be inclined relative to the frame. In other words, the tool bar and draft frame may tilt sidewise relative to the frame of the machine and may be moved up and down to be raised, lowered and adjusted.

It is undesirable to have the tool bar move sidewise bodily when it is in operating position, and in order to prevent this without interfering with the other adjustment, two arms 60 and 61 are provided, one pivoted to the draft member 14 and the other to the draft member 15. These two arms converge forwardly to form a tongue 62. The tongue is positioned in a groove or slot formed by the converging ends of two bars 63 and 64 rigidly attached to the frame of the machine and extending downwardly. The connection between the tongue 62 and the bars 63 and 64 is relatively loose so that the tool bar 10 may be tilted sidewise relative to the frame of the machine, but bodily sidewise movement is prevented. The triangular position of the bars makes the construction very rigid so that it will withstand the side thrust upon it.

The location of the U-shaped brackets 32 and 33 to which the links 30 and 31 are connected is such that the tool bar and the draft device is approximately in balance when no tools are connected to the tool bar, that is, these parts are in balance about an axis extending through the pivot points of the links 30 and 31 to the brackets 32 and 33. Preferably, the parts are slightly overbalanced to the rear so that the draft connection will be held taut, as illustrated in Figure 1.

When the tool bar is raised from the position illustrated in Figure 4 to that illustrated in Figure 1, the tendency is for the front end of the draft frame to raise first because the parts are slightly overbalanced, and also because the tools on the tool bar will further overbalance them. The front end raises until the chain 22 becomes taut, whereupon further upward movement of the front end is prevented and the remaining action is to lift the tool bar and tools clear of the ground. In order to prevent the tool bar from dropping too suddenly when the powerlift mechanism is tripped to lower it, there is provided a spring 70 attached at one end to a bracket 71 on the frame, and at its other end, to a link 72 connected to an arm 73 fixed on the shaft 46.

When the tool bar is raised, the parts occupy the position illustrated in Figure 1. As the tool bar is lowered, the parts move to the position illustrated in Figure 4 against the tension of the spring 70, that is, the shaft 46 rotates in a counter-clockwise direction, carrying with it, the arm 73 and the link 72, movement of the link being resisted by the tension of the spring 70. This prevents the tool bar from being dropped so suddenly as to damage the tools. The spring also serves to assist in raising the tool bar when the powerlift mechanism is operated for that purpose.

In the construction thus far described, the tool bar 10 is supported by the links 30 and 31 which are movable up and down by the adjusting levers and by the powerlift mechanism. These links hold the tool bar in certain adjusted or raised and lowered positions. It is sometimes desirable, however, to have the tool bar free to move up and down so that the tools connected to it can operate more efficiently. This freedom of movement must be obtained without destroying the capacity of the machine to lift the tool bar and without otherwise interfering with its normal operation.

This result is accomplished by widening the ends of links 30 and 31 and providing a slot 74 in them for the reception of the links 42 and 52. (See Fig. 5). This slot permits the links 30 and 31 to move relative to the connection of the links 42 and 52, and, consequently, the tool bar 10 is free to move up and down to a limited extent to adjust itself when tools such, for example, as disk harrow gangs are connected to the tool bar. This does not interfere with the raising action because the parts act as before, the link 42 serving to raise the link 52 until the connection strikes the top of the slot 74, whereupon the link 30 is picked up and the parts raised to the lifted position.

This construction also does not interfere with the adjusting feature because the adjustment consists in varying the position of the points of connection of the links 42 to the links 52. Movements of the adjusting lever change the range of this connection even though there may be a limited amount of relative movement between the parts.

In this way a "floating" frame is provided which gives perfect freedom and flexibility of movement when the machine is in operating position, and which may be raised by the powerlift mechanism when desired.

A wide variety of tools may be connected to the bar 10. The tools illustrated are moldboard plows 75, 76, and 77 carried on beams 78, 79 and 80. The ends of these beams are forged at 81 to fit the tool bar 10 and to cooperate with bolts 82 and a complementary clamping member 83 by means of which the beams are firmly and rigidly clamped to the tool bar. This type of connection has been found to be extremely rigid as well as simple to build and easy to adjust, connect, and disconnect. The number of plow bottoms connected to the tool bar can be varied at will and these can be spaced in any desired relation to vary the width of cut or they can be placed at one end of the tool bar for orchard plowing, etc.

It is to be understood that various other types of tools may be connected to the bar, some of these being illustrated in the copending application referred to. It is also possible to connect drag-behind devices, such as a wagon or a spreader, to the tool bar.

With a machine of this kind, a farmer can use one power unit for many farming purposes without having to buy separate complicated implements for each class of work. After having the power unit he can adapt it to different kinds of work by procuring various attachments for the tool bar which will work efficiently because of the facility with which the tool bar can be adjusted. It can be made "floating" when desired and can be raised and lowered by power. The operator also has the advantage that he is seated above his work where he can watch it.

It is to be understood that the structure shown is for illustration only and that variations may be made in it without departing from the spirit and scope of the invention as defined by the claims.

I claim:

1. A universal implement carriage for tractors comprising a wheeled frame having connections for connecting it to a tractor, a draft structure supported by the wheeled frame so as to be movable from a lowered or working position to a raised or transport position and vice-versa, said draft structure including means to which a wide variety of agricultural tools, including heavy tools such as plows, may be adjustably and detachably connected, a hitch device for connecting the draft structure to a tractor, powerlift mechanism operated by travel of the carriage, connections between the powerlift mechanism and the draft structure for raising and lowering the draft structure, means for adjusting said connections to vary the working position of the draft structure, said connections including parts having a limited relative vertical movement to permit a limited movement of the draft structure vertically relative to the wheeled frame when the draft structure is in working position to thereby permit the draft structure to have a limited floating action so that the tools may adjust themselves to inequalities in the soil without digging too deep or raising too high out of the ground.

2. A universal implement carriage for tractors comprising a wheeled frame having connections for connecting it to a tractor, a draft structure supported by the wheeled frame so as to be movable from a lowered or working position to a raised or transport position and vice-versa, said draft structure including means to which a wide variety of agricultural tools, including heavy tools such as plows, may be adjustably and detachably connected, a hitch device for connecting the draft structure to a tractor, powerlift mechanism operated by travel of the carriage, and connections between the powerlift mechanism and the draft structure, said connections including a link having a series of holes in one side and a slot in the other side to permit the connections to be adjusted so as to have a limited relative movement or so as to have substantially no relative movement.

3. A universal implement carriage for two-wheeled tractors of the type having a rearwardly extending coupling frame, comprising a wheeled frame having connections for attaching it to a tractor coupling frame to stabilize the implement, a draft structure supported by the wheeled frame so as to be movable from a lowered or working position to a raised or transport position and vice versa, and so that it may be inclined forwardly, rearwardly, or to either side relative to the frame, said draft structure including means to which a wide variety of agricultural tools, including heavy tools such as plows, may be adjustably and detachably connected, hitch connections for connecting the draft structure to a tractor, powerlift mechanism for raising and lowering the draft structure relative to the wheeled frame, and connections between the powerlift mechanism and the draft structure through which the powerlift mechanism may raise and lower the draft structure relative to the frame, adjusting means for said connections for adjusting the working position of the draft structure, said connections including parts having a limited relative movement vertically to permit the draft structure to have limited vertical movement relative to the frame while it is in working position to thereby permit the draft structure to float freely within limits so that the tools may adjust themselves to inequalities in the soil without digging too deeply into or rising too high out of the ground.

4. A universal implement carriage for two-wheeled tractors of the type having a rearwardly extending coupling frame, comprising a wheeled frame having connections for attaching it to a tractor coupling frame to stabilize the carriage, a draft structure supported by the wheeled frame so as to be movable from a lowered or working position to a raised or transport position and vice versa, said draft structure including means to which a wide variety of agricultural tools, including heavy tools such as plows, may be adjustably and detachably connected, hitch connections for connecting the draft structure to a tractor, powerlift mechanism for raising and lowering the draft structure relative to the wheeled frame, and connections between the powerlift mechanism and the draft structure through which the powerlift mechanism may raise and lower the draft structure relative to the frame, said connections having adjustable parts which may be connected together in one position wherein substantially no relative vertical movement of the draft structure and wheeled frame may take place, and in another position to permit a limited relative movement in a vertical plane in the working position of the draft structure.

5. A universal implement carriage for two-wheeled tractors of the type having a rearwardly extending coupling frame, comprising a wheeled frame having connections for attaching it to a tractor coupling frame to stabilize the carriage, a draft structure supported by the wheeled frame so as to be movable from a lowered or working position to a raised or transport position and vice versa, said draft structure including means to which a wide variety of agricultural tools, including heavy tools such as plows, may be adjustably and detachably connected, hitch connections for connecting the draft structure to a tractor, powerlift mechanism operated by travel of the carriage, connections between the powerlift mechanism and each side of the draft structure, means for adjusting each of the connections independently to vary the height of the sides of the draft structure, said connections each including parts having a limited relative movement in a vertical direction which permit a limited movement of the draft structure relative to the frame in a vertical plane when the draft structure is in working position so that said structure will have a floating action which will permit the tools to adjust themselves to inequalities in the soil without digging too deep into or jumping out of the ground.

In testimony whereof, I affix my signature.

HARRY A. BECHTELHEIMER.